April 22, 1930. A. HANCOCK 1,755,393

VEHICLE BUMPER

Filed Jan. 15, 1929

INVENTOR.
Arden Hancock
BY
Hardway Tather
ATTORNEYS.

Patented Apr. 22, 1930

1,755,393

UNITED STATES PATENT OFFICE

ARDEN HANCOCK, OF HOUSTON, TEXAS

VEHICLE BUMPER

Application filed January 15, 1929. Serial No. 332,605.

This invention relates to new and useful improvements in a vehicle bumper.

One object of the invention is to provide a bumper specially designed for use on the rear of a motor vehicle and formed to shield the spare wheel or tire carried on the rear end of the vehicle.

Another object of the invention is to provide a bumper of the character described which, in plan view, is of a general U-shaped contour, so as to surround the spare wheel, or tire, on the rear and which is formed of flexible or springy material.

In some types of motor vehicles the spare wheel, or tire rack, is anchored to the rear end of the vehicle body and the tire or wheel thereon is unprotected and in case of a rear end collision if the spare wheel or tire is struck the rear end of the body will usually be distorted. The bumper herein described has been particularly designed for the purpose of protecting the spare tire, or wheel, and thus preventing injury to the same, or to the rear end of the vehicle body.

With the above and other objects in view this invention has particular relation to certain novel features of construction, arrangement of parts and use, an example of which is given in this specification and illustrated in the accompanying drawings, wherein:—

Referring now more particularly to the drawings, wherein like numerals of reference designate similar parts in each of the figures the numeral 1 designates the vehicle as a whole. Attached to the rear end of the body of the vehicle there is an anchor 2 to receive a spare wheel, as 3, or a tire rack for carrying a spare tire. In case this wheel 3, or the spare tire, is unprotected, and a rear end collision should occur the anchor 2 will receive the force of the collision and the rear end of the body will be distorted and injured.

Figure 1:
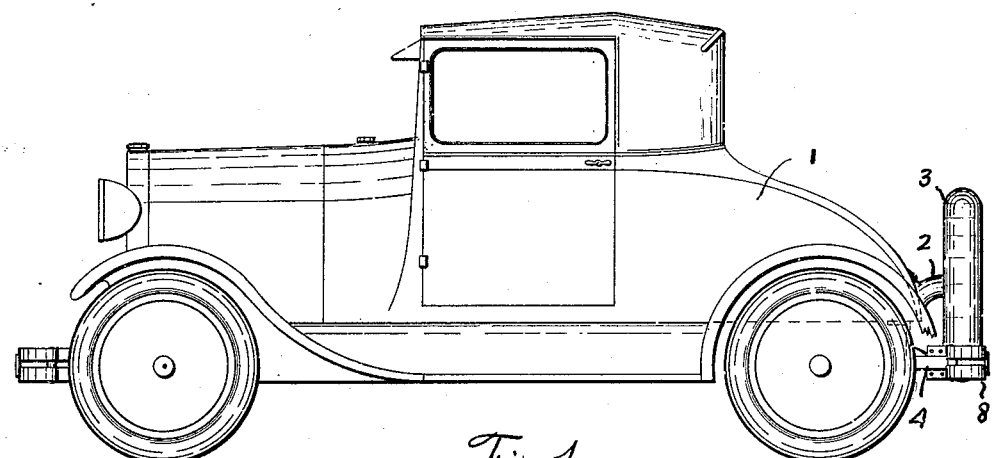
Figure 1 shows a side view of a motor vehicle equipped with the improved type of bumper, and showing the near side bumper removed.
Figure 2:
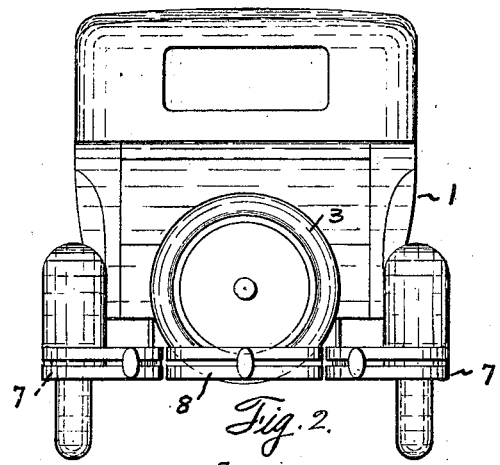
Figure 2 shows a rear view thereof.
Figure 3:
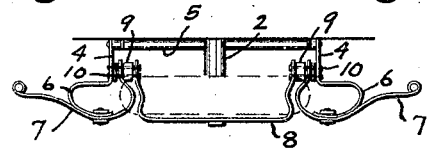
Figure 3 shows a plan view of the bumper.

There are the conventional side bumpers one on each side of the spare wheel, or tire. Each side bumper comprises a bar 4, which is attached to the chassis, said bars being reinforced by means of a transverse stay rod 5 to the ends of which the respective bars 4 are attached. The rear end 6 of each bar 4 is curved outwardly and there are the bumper arms 7, 7 whose inner ends are bolted to the corresponding bars 4 and these arms are curved around the outwardly curved ends 6 and are bolted thereto and their free ends extend outwardly as shown in Figure 2.

These side bumpers are flexible and are provided to protect the rear fenders of the vehicle. There is a U-shaped intermediate bumper 8 whose inner ends are attached to the corresponding side bumpers and this intermediate bumper surrounds the spare wheel, or tire, on the rear so as to receive the impact in case of a rear end collision. The side bumpers and intermediate bumper are formed of springy material so as to have a shock absorbing effect.

Between the ends of the intermediate bumper 8 and the side bumpers are the space blocks 9, 9 and the adjacent ends of said intermediate bumper and side bumpers are secured together by the bolts 10 which pass through said blocks 9 and form common securing means for securing the respective bumpers to the bars 4.

I have shown what I now consider to be the preferred form of the device but it is to be understood that the drawings and description are merely illustrative and it is contemplated that structural changes may be made within the principle of the invention.

What I claim is:

A rear end protector for motor vehicles designed to protect the rear fenders and spare tire, carried by the rear end of the vehicle, and comprising side bumpers spaced apart and arranged in the rear of the rear fenders of the vehicle, each side bumper comprising a bar attached to the vehicle chassis and extending rearwardly, the rear end of each bar being outwardly curved, bumper arms whose inner ends are bolted to the corresponding bars, said arms being curved around the outwardly curved ends of the corresponding bars and being bolted thereto and having free outer ends, a U-shaped intermediate bumper, space blocks between the ends of the intermediate bumper and the side bumpers and securing bolts passing through the respective ends of said intermediate bumper and through the corresponding blocks and side bumpers and forming common securing means for securing said bars and the adjacent ends of said bumper arms and intermediate bumper together.

In testimony whereof I have signed my name to this specification.

ARDEN HANCOCK.